United States Patent [19]
Wilt et al.

[11] Patent Number: 5,462,992
[45] Date of Patent: Oct. 31, 1995

[54] ACETOACETYLATED POLYMERS CROSSLINKED WITH CARBAMYLMETHYLAMINOTRIAZINES

[75] Inventors: Truman F. Wilt, Clinton; Deborah E. Hayes, Penn Hills Borough; Charles R. Krepley, Washington Township; Daniel E. Rardon, Squirrel Hill, all of Pa.

[73] Assignee: PPG Industries, Inc., Pittsburgh, Pa.

[21] Appl. No.: 414,159

[22] Filed: Mar. 31, 1995

[51] Int. Cl.$^6$ ........................................... C08F 8/32
[52] U.S. Cl. ........................ 525/176; 525/194; 525/220; 525/328.6; 525/329.9; 525/375; 525/437
[58] Field of Search ................................. 525/176, 194, 525/220, 328.6, 329.9, 375, 437

[56] References Cited

U.S. PATENT DOCUMENTS

| | | | |
|---|---|---|---|
| 4,708,984 | 11/1987 | Forgione et al. | |
| 4,710,542 | 12/1987 | Forgione et al. | |
| 5,089,561 | 2/1992 | Forgione et al. | |
| 5,089,617 | 2/1992 | Forgione et al. | |
| 5,100,969 | 3/1992 | Yamamoto et al. | 525/327.2 |
| 5,149,756 | 9/1992 | Demarey | 525/518 |
| 5,187,227 | 2/1993 | Yamamoto et al. | 525/123 |
| 5,288,820 | 2/1994 | Rector, Jr. et al. | 525/510 |
| 5,300,328 | 4/1994 | Rehfuss . | |

OTHER PUBLICATIONS

ASTM Designation: D–3363–92a; "Standard Test Method for Film Hardness by Pencil Test[1]"; Jan. 1993; pp. 441–442.
Balwant Singh, P. S. Forgione, J. A. Sedlak, L. Anderson; "Carbamylmethylated Melamines Novel Crosslinkers For The Coatings Industry"; American Cyanamid Co., Stamford Conn.; Organic Coatings Science and Technology, XV; 1989; pp. 379 thru 393.
Eastman Kodak Company; "Acetoacetoxyethyl Methacrylate (AAEM) And Acetoacetyl Chemistry"; Publication No. N–319; Oct. 1988; pp. 3 thru 11.
Eastman Kodak Company; "From Eastman for the Resins Market"; Synthesis Tips For The Use of t–BAA in Acetoacetylated Coatings Resins; 91–RSL–3; Kingsport, Tenn.; Jul. 1991.

*Primary Examiner*—Bernard Lipman
*Attorney, Agent, or Firm*—Paul S. Chirgott

[57] ABSTRACT

This invention provides curable coating compositions which contain acetoacetylated polymers and carbamylmethylaminotriazine crosslinking agents. Active hydrogen containing materials and cure catalysts can, optionally, be added to the curable compositions made in accordance with this invention. The invention further provides articles of manufacture having at least one substrate coated with a curable composition which contains acetoacetylated polymers and triazine crosslinking agents.

27 Claims, No Drawings

ACETOACETYLATED POLYMERS CROSSLINKED WITH CARBAMYLMETHYLAMINOTRIAZINES

FIELD OF THE INVENTION

This invention pertains to curable coating compositions and to methods of making and using them. More particularly, the present invention pertains to curable compositions comprising acetoacetylated polymers and triazine crosslinking agents.

BACKGROUND OF THE INVENTION

The use of acetoacetyl chemistry in the production of coatings and resins is very desirable. For example, the presence of acetoacetate pendent groups on coatings or resins provides reduced resin viscosity. This, in turn, can lead to the production of lower VOC coatings.

Acetoacetylated polymer coatings exhibit improved flexibility, corrosion resistance and adhesion to metal substrates. Moreover, when using acetoacetyl chemistry in the production of coatings and resins, the acetoacetylated groups attached to the polymer can be used to modify or crosslink that polymer.

Acetoacetylated polymers are known to react with a number of different components. However, there is a need for improved ways of crosslinking such polymers, especially in light of certain environmental and health concerns associated with many conventional crosslinkers.

The incorporation and use of triazines as crosslinking agents are known. However, such compositions often have shortcomings associated therewith. For example, some triazines have a limited compatibility with organic solvents. Therefore, they often require formulations with higher solvent contents. Additionally, the coatings deposited with such compositions often result in cured films that have relatively lower gloss levels and poorer flow, flexibility and impact resistance properties. Also, such coatings often require the use of higher curing temperatures (e.g., 230° C. or higher).

SUMMARY OF THE INVENTION

The present invention avoids many of the shortcomings typically associated with the implementation of triazines as crosslinking agents. Particularly, it has been discovered that, when acetoacetylated polymers are combined with a particular class of triazine compounds to form curable compositions, the cured coatings resulting therefrom typically have relatively higher gloss levels and improved flow characteristics. Moreover, these coatings are hard yet flexible and have good impact resistance. Also, depending upon which triazine compound is selected, coatings made with such compositions can be cured at relatively low temperatures (e.g., as low as 120° C.). Additionally, the curable compositions made in accordance with this invention offer a broad range of compatibility with organic solvents. Furthermore, by practicing this invention, coating formulations with low solvent contents and low formaldehyde contents can be formulated.

Therefore, one object of this invention is to provide novel curable coating compositions comprising acetoacetylated polymers and a particular class of triazine crosslinking agents.

Other objects, aspects and advantages of the present invention will be apparent to those skilled in the art upon reading the specification and the appended claims which follow.

In one embodiment of this invention, curable coating compositions comprise:
(a) an acetoacetylated polymer, and
(b) a triazine compound selected from the group consisting of:
(i) triaminotriazine compounds of the structure

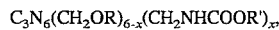

(ii) benzoguanamine compounds of the structure

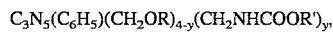

(iii) oligomers of (i) or of (ii), and
(iv) mixtures of at least two of any of (i), (ii) and (iii), wherein the R and R' groups are, independently, radicals derived from monoalkyl ethers of alkylene glycols having at least 4 carbon atoms and monoaryl ethers of alkylene glycols having at least 8 carbon atoms, alone or combined with alkyl groups having 1 to 20 carbon atoms, where x is in the range of from 2 to 6, and where y is in the range of from 2 to 4.

In another embodiment of this invention, the R groups are, independently, hydrogen or alkyl groups of from 1 to 12 carbon atoms. Moreover, the R' groups are, independently, alkyl groups of from 1 to 20 carbon atoms; x is in the range of from 2 to 6; and, y is in the range of from 2 to 4.

In yet another embodiment of this invention, the R groups are, independently, hydrogen or alkyl groups of from 1 to 12 carbon atoms. Moreover, the R' groups are, independently, beta-hydroxyalkyl groups of from 2 to 18 carbon atoms, alone, or combined with alkyl groups of from 1 to 18 carbon atoms; x is in the range of from 3 to 6; and, y is in the range of from 2 to 4.

When practicing any embodiment of this invention, the acetoacetylated polymer has the following general structure:

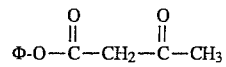

wherein Φ is a polymeric backbone.

The present invention also provides curable compositions which further comprise an optional active hydrogen containing material which comprises a polymeric material containing at least two reactive carboxyl, alcoholic hydroxy, amide or amine groups, or a mixture of such groups, or a group convertible to such groups.

Also provided by this invention are articles of manufacture comprising substrates protectively coated with at least one of the aforementioned curable compositions and articles of manufacture comprising at least one of the aforementioned curable compositions and a filler (e.g., glass, glass powder, glass beads, glass fibers and/or foundry sand).

DETAILED DESCRIPTION OF THE INVENTION

According to the present invention, curable compositions are prepared which comprise an acetoacetylated polymer (which will be described later) and a particular class of a triazine crosslinking agent.

In one embodiment of the invention, the triazine compound is selected from the group consisting of:
(i) triaminotriazine compounds of the structure $C_3N_6(CH_2OR)_{6-x}(CH_2NHCOOR')_x$, (ii) benzoguanamine compounds of the structure $C_3N_5(C_6H_5)(CH_2OR)_{4-y}(CH_2NHCOOR')_y$, (iii) oligomers of (i) or of (ii), and (iv) mixtures of at east two of any of (i), (ii) and (iii), wherein the R and R' groups are, independently, radicals derived from monoalkyl ethers of alkylene (including polyalkylene) glycols having at least 4 carbon atoms and monoaryl ethers of alkylene (including polyalkylene) glycols having at least 8 carbon atoms.

It is preferred for the monoalkyl ethers of alkylene glycols to have from 4 to 12 carbon atoms, and for the monoaryl ethers of alkylene glycols to have from 8 to 12 carbon atoms. For example, in the case of the monomethyl ether of propylene glycol, the R and R' groups are as follows:

$$CH_3O-\underset{\underset{CH_3}{|}}{CH}-CH_2-.$$

In the case of the monophenyl ether of diethylene glycol, the R and R' groups are as follows:

$C_6H_5-O-CH_2-CH_2-O-CH_2-CH_2-$.

Thus, in the structures of (i) and (ii) above, the R and R' groups are alkoxy substituted alkylene groups (including alkylene oxy groups) and aryloxy substituted alkylene groups (including alkylene oxy groups). Preferably, the alkoxy groups contain from 1 to 10 carbon atoms; the aryloxy groups contain from 6 to 10 carbon atoms; and, the alkylene groups contain from 2 to 6 carbon atoms.

In the structure of (i) above, x is in the range of from 2 to 6 carbon atoms, preferably in the range of from 3 to 6 carbon atoms. Moreover, y is in the range of from 2 to 4 carbon atoms, preferably in the range of from 3 to 4 carbon atoms. Furthermore, the preferred alkylene glycols are ethylene glycol, propylene glycol, diethylene glycol and dipropylene glycol; and, the preferred monoaryl and monoalkyl substituents are phenyl, methyl, propyl, butyl and hexyl groups.

Also in the structures of (i) and (ii) above, the R and R' groups can be mixed groups and can also include alkyl groups of from 1 to 20 carbon atoms. Preferred alkyl substituents have from 1 to 4 carbon atoms (e.g., methyl and butyl groups).

Starting materials to produce the alkyl or aryl triazine compounds used as the crosslinking agents in this embodiment can be hydroxymethyl or alkoxymethyl melamines and/or benzoguanamines and oligomers thereof known in the art. Many of these starting materials are either commercially available or can be made by well known procedures.

To make the crosslinker of this embodiment, the melamine or benzoguanamine compounds may be reacted with glycol ether carbamates (e.g., methoxypropyl carbamate and butoxyethyl carbamate) either alone or in combination with alcohols and alkylcarbamates. The glycol ether carbamates may be prepared by reacting glycol ethers (e.g., the monoalkyl and monoaryl ethers of alkylene glycols mentioned above) with urea while in the presence of a transesterification catalyst (e.g., tin, nickel or lead).

An idealized reaction equation for the preparation of the crosslinker compounds from an alkoxymethylmelamine or a hydroxymethylmelamine and glycol ether carbamates is as follows:

$$C_3N_6(CH_2OR)_6 + xH_2NCOOR' \xrightarrow{H^+} C_3N_6(CH_2OR)_{6-x}(CH_2NHCOOR')_x + xROH \quad (I)$$

wherein R, R' and x are as defined above.

The mole ratio of melamine compound to glycol ether carbamate in equation (I) is selected to provide the desired degree of substitution. Preferably, from 3 to 6 moles of glycol ether carbamate can be used per 1 mole of melamine compound. For example, if less than 3 moles of the carbamate compound are used per mole of the melamine compound, premature gelation can occur. This chemical reaction is typically carried out by heating in the melt or in solution.

With the benzoguanamine starting material, the preferred mole ratio of glycol ether carbamate to benzoguanamine is 3:1 to 4:1. In other words, for one preferred benzoguanamine compound shown in the structure (ii) above, y equals 3 or 4.

In this embodiment, the reaction temperature for preparing the triazine compounds typically ranges from between 70° to 125° C. The preferred reaction temperature ranges from between 95° to 115° C. The quantity of alcohol evolved gives an indication of reaction completion. Moreover, an acid catalyst is usually present during this reaction. With 6 moles of glycol ether carbamate, the reaction is usually not 100% complete unless forced. However, a high degree of substitution is obtained (i.e., with the benzoguanamine compound, x equals 5 or 6, and y equals 3 or 4).

Preferably, the reaction used to prepare the triazine compounds employed when practicing this embodiment is conducted in the presence of a high boiling alcohol (e.g., methoxy propanol and butoxyethanol). These high boiling alcohols bring about an etherification or transetherification reaction with the starting melamine or benzoguanamine compound.

It is noted that the particular triazine compounds made in accordance with this embodiment tend to be oligomeric. Specifically, gel permeation chromatography indicates the majority of the product is comprised of a distribution of oligomers.

In another embodiment of the invention, the particular class of triazine compounds employed are alkylcarbamylmethyltriazines. Here, the R groups of the structures (i) and (ii) are, independently, hydrogen or alkyl groups of from 1 to 12 carbon atoms. Moreover, the R' groups of these same structures are, independently, alkyl groups of from 1 to 20 carbon atoms; x is in the range of from 2 to 6; and, y is in the range of from 2 to 4.

As starting materials to produce the alkylcarbamylmethyltriazines of this embodiment, there can be used the hydroxymethyl or alkoxymethylmelamines and/or benzoguanamines and oligomers thereof known in the art. Many of the starting materials are either commercially available, or can be made by well known procedures. In accordance with this embodiment, the starting materials are reacted with alkyl carbamates in the presence of an acid catalyst. Examples of suitable carbamates include, without limitation, methyl carbamate and propyl carbamate.

An idealized reaction equation for the preparation of the hydroxymethyl or alkoxymethylmelamines employed in this embodiment of the invention is the same as equation (I) set out above. In this equation, the mole ratio of alkyl carbamate to the melamine compound is selected to provide the desired degree of substitution. By way of illustration, from 2 to 6 moles of the carbamate can be used for each mole of the melamine. The reaction for producing the triazine crosslinking agents used in this embodiment is typically carried out by heating in the melt or in solution (e.g., in benzene, toluene, xylene, chlorobenzene, dichlorobenzene), in the presence of catalytic amounts of an acid (e.g., para-toluene sulfonic acid, nitric acid, sulfuric acid, and the like), at temperatures ranging from between 80° to 150° C., preferably from between 90° to 120° C.

When preparing a triazine compound of this embodiment, the measurement of the quantity of alcohol evolved gives an indication of reaction completion. For example, with 6 moles of alkyl carbamate, reaction is usually not 100% complete, unless forced, but a high degree of substitution is obtained. Analysis by gel permeation chromatography shows that treatment of hexamethoxymethylolmelamine with substantially less than 6 moles of alkyl carbamate gives a distribution similar to the starting material with degrees of substitution ranging up to 6. Only those compounds wherein at least two carbamylmethyl groups are present are the desired crosslinkers for the purposes of this embodiment, even though residual alkoxymethyl groups can provide crosslinking.

Instead of alkoxymethylmelamines, hydroxymethylmelamines, and the corresponding benzoguanamine analogs and oligomers thereof, can be used as starting materials for the triazine compounds prepared in accordance with this embodiment. The products from this reaction can be recovered by any convenient means after removal of by-product water or alcohol is complete. Simply cooling them to room temperature will leave the product as a residue. The acid catalyst can thereafter be removed by neutralization.

The substituents defined by R and R' in the structures of (i) and (ii) can vary widely in carbon content. Moreover, the groups can be straight chain, branched chain and cyclic.

In yet another embodiment of the invention, the particular class of triazine compounds employed are beta-hydroxy alkylcarbamylmethyltriazines. Here, the R groups of the particular triazine compounds of the structures (i) and (ii) above are, independently, hydrogen or alkyl groups of from 1 to 12 carbon atoms. Moreover, the R' groups of these same structures are, independently, beta-hydroxyalkyl groups of from 2 to 18 carbon atoms, alone, or in combination with alkyl groups of from 1 to 18 carbon atoms; x is in the range of from 3 to 6; and, y is in the range of from 2 to 4.

As starting materials to produce the beta-hydroxy alkylcarbamylmethyltriazines of this embodiment, there can be used the hydroxymethyl or alkoxymethyl melamines and/or benzoguanamines and oligomers thereof known in the art. Many of the starting materials are either commercially available, or can be made by well known procedures. In accordance with this embodiment, the starting materials for preparing the triazine compounds are reacted with beta-hydroxy alkyl carbamates in the presence of an acid catalyst. An example of a suitable beta-hydroxy alkyl carbamate is beta-hydroxypropyl carbamate. This carbamate can be reacted either alone or in admixture with alkyl carbamates.

The beta-hydroxylalkyl carbamates are made, for example, by reacting propylene carbonate with ammonia as follows:

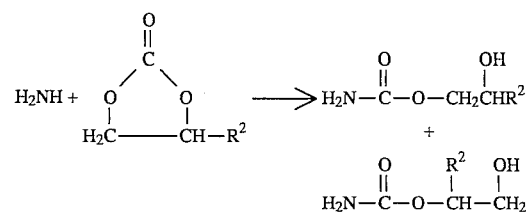

wherein the $R^2$ group is hydrogen or an alkyl group having from 1 to 16 carbon atoms. Depending on the manner in which the ring is opened, the $R^2$ group will be alpha- or beta-oriented with respect to the carbamyl function.

The cyclic carbonates are made in known ways from the corresponding known 1,2-diols and include, for example, 1,2-polyols ranging in molecular weight from about 62 to 286 (e.g., ethylene glycol, 1,2-propylene glycol, 1,2-butanediol, 1,2-hexanediol, and the like, up to 1,2-octadecanediol).

An idealized reaction equation for the preparation of the hydroxymethyl or alkoxymethylmelamines employed in this embodiment of the invention is the same as equation (I) set out above. In this equation, the mole ratio of beta-hydroxyalkyl carbamate to the melamine compound is selected to provide the desired degree of substitution. By way of illustration, from 3 to 6 moles of the carbamate can be used for each mole of the melamine. For example, if less than 3 moles of the carbamate are used per mole of melamine compound, premature gelation can be a problem. This reaction is typically carried out by heating in the melt or in solution (e.g., in benzene, toluene, xylene, chlorobenzene, dichlorobenzene), in the presence of catalytic amounts of acid (e.g., para-toluene sulfonic acid), at temperatures ranging from between 70° to 150° C., preferably from between 75° to 120° C.

When preparing a triazine compound of this embodiment, the measurement of the quantity of alcohol evolved gives an indication of reaction completion. With 6 moles of beta-hydroxy alkyl carbamate, reaction is usually not 100% complete, unless forced, but a high degree of substitution, is obtained. Analysis by gel permeation chromatography shows that treatment of hexamethoxymethylolmelamine with substantially less than 6 moles of beta-hydroxy alkyl carbamate gives a product which contains a similar oligomeric distribution as a triamino-triazine reactant comprised of a mixture of compounds with degrees of substitution ranging up to 6. Of course, only those compounds wherein two carbamylmethyl groups are present are the desired crosslinkers according to this embodiment, even though residual alkoxymethyl groups can provide crosslinking.

Instead of alkoxymethylmelamines, hydroxymethylmelamines, and the corresponding benzoguanamine analogs and oligomers thereof, can be used as starting materials for the triazine compound made in accordance with this embodiment. With benzoguanamines, it is believed that, if less than 2 moles of hydroxyalkyl carbamate is used per mole of triazine, premature gelatin may be encountered.

The products from this reaction can be recovered by any convenient means after removal of by-product water or alcohol is complete. Simply cooling them to room temperature will leave the product as a residue. The acid catalyst can thereafter be removed by neutralization.

For this embodiment, the substituents defined by the R and R' groups in the structures of (i) and (ii) above can vary widely in carbon content. Moreover, the groups can be straight chain, branched chain and cyclic.

The curable compositions prepared in accordance with any embodiment of the invention contain at least 5 percent by weight of at least one of the aforementioned triazine compounds. This weight percentage is based upon weight of the curable coating composition. The weight ratio of the particular triazine component to the acetoacetylated polymer component typically ranges from between 1:20 to 1:2, preferably, from between 1:15 to 1:5.

The acetoacetylated polymers used when practicing any embodiment of this invention can be prepared in a number of different ways known in the art. For example, these polymers can be prepared by polymerizing an acetoacetylated monomer into the polymer chain or by acetoacetylating a polymer after chain polymerization. For example, polymers such as hydroxylated polyesters can be acetoacetylated with diketene, a diketene-acetone adduct, methyl acetoacetate or ethyl acetoacetate.

Acetoacetylated polymers useful when practicing this invention have the general formula:

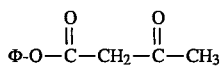

wherein Φ is a polymeric backbone.

Any suitable acetylacetylated polymer can be used when practicing this invention. Examples of such suitable polymers include acetoacetylated polyesters and acetoacetylated acrylics.

Typically, the acetoacetylated polymers used when practicing this invention have a molecular weight ($M_w$) ranging from between about 500 to about 30,000. Generally, the molecular weight of these polymers range from between about 600 to about 20,000, preferably, from between about 700 to about 10,000, and even more preferably, from between about 800 to about 5,000.

In addition to the acetoacetylated polymer component and the triazine component, the curable coating composition prepared in accordance with the present invention also typically includes a cure catalyst. The cure catalyst can be a metal salt and/or complex of a metal (e.g., lead, zinc, iron, manganese, and preferably tin). General examples of suitable salts of these metals include acetates, octoates, laurates and naphthenates. Specific examples of suitable salts, include tetrabutyldiacetoxy distannoxane, dibutyltindilaurate, dibutyltinoxide and tin acetyl acetonate complex.

Typically, the cure catalyst is used in amounts effective to accelerate cure at the temperatures employed such that the reaction is completed within a time period ranging from between 30 seconds to 60 minutes. The reaction temperatures employed when practicing any embodiment of this invention typically range from between 120° to 400° C., preferably from 130° to 360° C., and more preferably, from between 150° to 225° C. Under these circumstances, the selected cure catalyst is generally used in amounts from between 0.1 to 2.0%, preferably from between 0.2 to 1.7% metal by solids weight based on the weight of the curable coating compositions.

Acid catalysts can also be used when the triazine compound contains ether groups. Examples of such catalysts include nitric acid, sulfuric acid, p-toluenesulfonic acid and the like. When used, the acid catalyst is present in amounts of 0.1 to 2.0% by weight based on weight of the curable coating composition. Preferably, a combination of a tin catalyst and an acid catalyst is used.

An optional component of the curable coating composition made in accordance with this invention is an active hydrogen containing material. Such an active hydrogen containing material has, as the active hydrogen group, a group selected from carboxyl, alcoholic hydroxyl, amido, primary amine, secondary amine (including imine), thiol and the like. The active hydrogen containing materials useful herein are typically film forming compositions.

Examples of active hydrogen containing materials which can be used when practicing this invention include acrylic polymers, polyurethanes, polyesters, epoxy resins, and the like that contain active hydrogen groups. Especially suitable polymers are polyesters and polyacrylates containing pendent hydroxyl groups as reaction sites. The former are obtained in a known manner by the reaction of polycarboxylic acids with excess quantities of polyhydric alcohols. The latter are obtained by the copolymerization of acrylic or methacrylic acid or esters thereof with hydroxy-group-containing esters of these acids, optionally with the additional inclusion of vinyl monomers, such as styrene.

Hydroxy-group-containing polyurethanes can be obtained in known manners by the reaction of polyisocyanates with excess quantities of compounds containing at least two hydroxy groups. Suitable hydroxy-group-containing polyesters for use as the optional active hydrogen containing component include a polyester which is commercially available under the tradenames of CYPLEX® 1473 and CYPLEX® 1531 from American Cyanamid Company and Cargill Polyester 5776. Suitable hydroxy-functional acrylic resins are commercially available from S. C. Johnson & Son, Inc. under the tradename JONCYRL® 500. Also suitable for use are hydroxy terminated polycaprolactones, as well as the copolymer of 50% styrene, 20% hydroxypropyl methacrylate and 30% butyl acrylate and the polyester of phthalic acid, adipic acid, ethanediol and trimethylolpropane, with a hydroxy number of 130 and an acid number of 1.5.

Pigments, and various other conventional additives such as antioxidants, surface active agents, coupling agents, flow control additives, and the like, may be included in the curable coating compositions made in accordance with the present invention. The pigment composition may be of any conventional type (e.g., one or more pigments such as iron oxides, lead oxides, strontium chromate, carbon black, titanium dioxide, talc, barium sulfate, cadmium yellow, cadmium red, chromic yellow, or the like).

After deposition on a substrate, the coating composition is cured. This may be accomplished by any suitable means known to those skilled in the art. Examples of such suitable curing means include the use of baking ovens and/or banks of infrared heat lamps. If the compositions are thermally cured, curing can be obtained at temperatures in the range of from between 120° to 400° C., preferably from between 130° C. to 360° C., and more preferably from between 150° to 225° C.

Conventional methods can be used to combine the novel curable coating compositions with fillers and/or reinforcements and to shape them into useful articles by means well known to accomplish these functions with curable aminotriazine resins. For example, mixing the compositions with glass fillers and heating provides insulation shapes for pipes, and the like, after curing, and mixing with foundry sand and curing provides core molds for metal casting.

EXAMPLES

The examples which follow are intended to assist in a further understanding of this invention. Particular materials employed, species and conditions are intended to be illustrative of the invention and are not limitive of the reasonable scope thereof.

EXAMPLE I

This example demonstrates the preparation of a carbamylmethylaminotriazine. This triazine compound is a reaction product of 5 moles of methoxypropyl carbamate with 1 mole of hexamethoxymethylmelamine.

Specifically, a homogeneous mixture was prepared by mixing in a flask 440.0 grams of oligomeric hexamethoxymethylmelamine, 750 grams of a solution of methoxypropyl carbamate in 500 grams of DOWANOL® PM solvent, and 2.40 grams of methane sulfonic acid. The flask equipped with a Dean-Stark distillation trap and a nitrogen sparge inlet was maintained at 100° C.

Then, over a 3 to 4 hour period, 160 grams of distillate were collected in the receiver. The reactor was then fitted with a vacuum distillation head, and sufficient solvent was removed at 200 mm Hg to achieve a Gardner-Holdt viscosity of Z1. The resulting clear, colorless resin was measured at 69.8% total nonvolatiles (110° C., 60 minutes). Gas chromatographic analysis showed less than 2% residual carbamate by peak area. The approximate formula for the resulting composition is:

$C_3N_6(CH_2OCH_3)(CH_2NHCOOCH(CH_3)CH_2OCH_3)_5$

Gel permeation chromatography showed a fairly uniform distribution of oligomeric material (about 80%, $M_w$ 3721) and a single peak corresponding to monomeric carbamylmethylaminotriazine material.

EXAMPLE II

This Example demonstrates the preparation of an acetoacetylated polyester. In this Example, 414.3 grams (2.04 equivalents) of adipic acid-propylene glycol polyester and 322.8 grams (2.04 equivalents) of tert-butyl acetoacetate were both charged into a three-liter, four-necked round bottom flask. The flask was equipped with a motor driven stainless steel paddle agitator, a thermocouple to record batch temperature, a Dean-Stark water trap connected with a condenser to collect distillate evolved and an inert gas sparge tube.

Heat was applied to the flask by a Glas-Col heating mantle. The temperature was gradually increased to 115° C. and held there until all of the tertbutanol was evolved. The reaction was considered complete when gas chromatographic analysis indicated that the tert-butanol content was less than 2%, or when non-volatiles were greater than 95%. To achieve these specifications, a slight vacuum was applied during the distillation process. The resulting acetoacetylated polyester is hereinafter referred to as Sample 1.

EXAMPLE IV

This Example demonstrates the preparation of an acetoacetylated polyester. In this Example, 443.0 grams (2.29 equivalents) of an adipic acid/propylene oxide polyester supplied by PPG Industries, Inc. and 362.7 grams (2.29 equivalents) of tert-butyl acetoacetate were both charged into a three-liter, four-necked round bottom flask. The flask was equipped with a motor driven stainless steel paddle agitator, a thermocouple to record batch temperature, a Dean-Stark water trap connected with a condenser to collect distillate evolved and an inert gas sparge tube.

Heat was applied to the flask by a Glas-Col heating mantle. The temperature was gradually increased to 115° C. and held there until all of the tertbutanol was evolved. The reaction was considered complete when gas chromatographic analysis indicated that the tert-butanol content was less than 2%, or when non-volatiles were greater than 95%. To achieve these specifications, a slight vacuum was applied during the distillation process. The resulting acetoacetylated polyester is hereinafter referred to as Sample 2.

Example IV

This Example demonstrates the preparation of an acetoacetylated polyester. In this Example, 1266.1 grams (16.80 equivalents) of 2,2,4-trimethyl-1,3-pentanediol, 334.3 grams (4.58 equivalents) of adipic acid, 464.8 grams (5.60 equivalents) of isophthalic acid, 5.10 grams (0.25% on monomer solids) of triphenyl phosphite, and 3.60 grams (0.18% on monomer solids) of dibutyl tin oxide were all charged into a five-liter, four-necked round bottom flask. The flask was equipped with a motor driven stainless steel paddle agitator, a thermocouple to record batch temperature, a Dean-Stark water trap connected with a condenser to collect distillate evolved and an inert gas sparge tube.

Heat was applied to the flask by a Glas-Col heating mantle. The temperature was gradually increased to 132° C. and held there for one hour. The temperature was then increased to 171° C. and held there for 30 minutes. The temperature was further increased to 215° C. and held there until the acid value of the reaction mixture was less than five.

Thereafter, the reaction mixture was cooled to approximately 50° C. and 38.5 grams (5.30 equivalents) of tert-butyl acetoacetate was charged thereto. The temperature of the reaction mixture was then gradually increased to 115° C. and held there until all of the tert-butanol was evolved. The reaction was considered complete when gas chromatographic analysis indicated that the tert-butanol content was less than 2%, or when non-volatiles were greater than 95%. To achieve these specifications, a slight vacuum was applied during the distillation process. The resulting acetoacetylated polyester is hereinafter referred to as Sample 3.

Example V

This Example demonstrates the preparation of an acetoacetylated polyester. In this Example 944.0 grams (16.0 equivalents) of 1,6 hexane diol, 616.0 grams (8.0 equivalents) of hexahydrophthalic anhydride, 3.90 grams (0.25% on monomer solids) of triphenyl phosphite, and 2.80 (0.18% on monomer solids) of dibutyl tin oxide were all charged into a three-liter, four-necked round bottom flask. The flask was equipped with a motor driven stainless steel paddle agitator, a thermocouple to record batch temperature, a Dean-Stark water trap connected with a condenser to collect distillate evolved and an inert gas sparge tube.

Heat was applied to the flask by a Glas-Col heating mantle. The temperature was gradually increased to 220° C. and held there until the acid value of the reaction mixture was less than four. Gradual heating was necessary due to the slight exotherm associated with the opening of the anhydride.

Thereafter, the reaction mixture was cooled to approximately 50° C. and 1026.7 grams (6.49 equivalents) of tert-butyl acetoacetate was charged thereto. The temperature of the reaction mixture was then gradually increased to 115° C. and held there until all of the tert-butanol was evolved. The reaction was considered complete when gas chromatographic analysis indicated that the tert-butanol content was less than 2%, or when non-volatiles were greater than 95%. To achieve these specifications, a slight vacuum was applied during the distillation process. The resulting acetoacetylated polyester is hereinafter referred to as Sample 4.

Example VI

This Example demonstrates the preparation of an acetoacetylated polyester. In this Example, 152.2 grams (4.00 equivalents) of 1,2 propylene glycol, 236.0 grams (4.00 equivalents) of 1,6 hexane diol, 308.0 grams (4.00 equivalents) of hexahydrophthalic anhydride, 1.70 grams (0.25% on monomer solids) of triphenyl phosphite, and 1.30 (0.18% on monomer solids) of dibutyl tin oxide were all charged into a three-liter, four-necked round bottom flask. The flask was equipped with a motor driven stainless steel paddle agitator, a thermocouple to record batch temperature, a Dean-Stark water trap connected with a condenser to collect distillate evolved and an inert gas sparge tube.

Heat was applied to the flask by a Glas-Col heating mantle. The temperature was gradually increased to 220° C. and held there until the acid value of the reaction mixture was less than four. Gradual heating was necessary due to the slight exotherm associated with the opening of the anhydride.

Thereafter, the reaction mixture was cooled to approximately 50° C. and 512.5 grams (3.24 equivalents) of tert-butyl acetoacetate was charged thereto. The temperature of the reaction mixture was then gradually increased to 115° C. and held there until all of the tert-butanol was evolved. The reaction was considered complete when gas chromatographic analysis indicated that the tert-butanol content was less than 2%, or when non-volatiles were greater than 95%. To achieve these specifications, a slight vacuum was applied during the distillation process. The resulting acetoacetylated polyester is hereinafter referred to as Sample 5.

Example VII

This Example demonstrates the preparation of an acetoacetate functional acrylic. In this Example, 280.0 grams of xylene was charged into a three-liter, four-necked round bottom flask. The flask was equipped with a motor driven stainless steel paddle agitator, a thermocouple to record batch temperature, a Dean-Stark water trap connected with a condenser to collect distillate evolved and an inert gas sparge tube.

Heat was applied to the flask by a Glas-Col heating mantle. The temperature was gradually increased until the reaction mixture began to reflux. This occurred at approximately 144° C. Thereafter, 60.0 grams of LUPERSOL® 555M-60 (a commercially available t-amyl peroxyacetate supplied by Elf Atochem), 82.0 grams of xylene, 240 grams (40.0% solids) of 2(acetoacetoxyethyl methacrylate, 120.0 grams (20% solids) of styrene, 120.0 grams (20% solids) of methyl methacrylate, and 120.0 grams (20% solids) of isobutyl methacrylate were all added concurrently to the refluxing reaction mixture over a three hour period. After the three hour charging period, the reaction mixture was maintained at 144° C. for an additional hour.

After the additional hour of reflux, 10.0 grams of LUPERSOL 555M-60 peroxy-acetate and 20.0 grams of xylene were charged to the refluxing reaction mixture over a fifteen minute period. The reaction mixture was then heated to, and maintained at, a temperature of 144° C. for an additional hour. The resulting acetoacetate functional acrylic is hereinafter referred to as Sample 6.

Example VIII

This Example demonstrates the preparation of a pigmented coating composition. The coating composition was prepared by blending together 18.95 parts by weight of Sample 1 from above, 45.54 parts of a pigment blend, 1.33 parts of additives including dibutyltindilaurate, DISPER-BYK® 110 dispersing agent as supplied by Byk-Chemie, a polyethylene wax dispersion in xylene and 2-ethylhexylacrylate, and 8.21 parts of solvent to form a homogeneous grind paste mixture. Thereafter, 25.98 parts of the carbamylmethylaminotriazine prepared in accordance with Example I was added to obtain the final coating composition. The resulting coating composition is hereinafter referred to as Coating 1.

A standard polyester-melamine coating commercially available from PPG Industries, Inc. under the tradename POLYCRON® was used as a control sample. The control coating composition represents a conventionally crosslinked system.

Example IX

This Example demonstrates the preparation of an unpigmented coating composition. The coating composition was prepared by blending together 37.10 parts of Sample 2 from above, 1.23 parts of additives including dibutyltindilaurate and SILWET® L7500 wetting agent as supplied by Van Water, 53.45 parts carbamylmethylaminotriazine and 8.22 parts of solvent to form a homogeneous mixture. The resulting coating composition is hereinafter referred to as Coating 2.

An unpigmented control sample was then prepared by blending 44.9 parts of polyester resin supplied by PPG Industries, 44.6 parts of CYMEL® 303 melamine crosslinker supplied by Cytec, 1.75 parts of additives including dinonylnaphthalene sulfonic acid, and 8.75 parts of solvent. This control sample is hereinafter referred to as Control Sample A.

Example X

This Example demonstrates the preparation of an unpigmented coating composition. The coating composition was prepared by blending together 48.95 parts of Sample 3 from above, 1.15 parts of additives including dibutyltindilaurate and SILWET® L7500 wetting agent, 38.73 parts of the carbamylmethylaminotriazine prepared in accordance Example I, and 11.2 parts of solvent to form a homogeneous mixture. The resulting coating composition is hereinafter referred to as Coating 3.

Example XI

This Example demonstrates the preparation of an unpigmented coating composition. The coating composition was prepared by blending together 41.74 parts of Sample 4 from above, 1.28 parts of additives including dibutyl-tindilaurate and SILWET® L7500 wetting agent, 51.10 parts of the carbamyl-methylaminotriazine made in accordance with Example I and 5.90 parts of solvent to form a homogeneous mixture. The resulting coating composition is hereinafter referred to as Coating 4.

Example XII

This Example demonstrates the preparation of an unpigmented coating composition. The coating composition was prepared by blending together 41.78 parts of Sample 5 from above, 1.18 parts of additives including dibutyltindilaurate and SILWET® L7500 wetting agent, 49.43 parts of carbamyl-methylaminotriazine made in accordance with Example I and 7.61 parts of solvent to form a homogeneous mixture. The resulting coating composition is hereinafter referred to as Coating 5.

Example XIII

This Example demonstrates the preparation of an unpigmented coating composition. The coating composition was prepared by blending together 55.24 parts of Sample 6 from above, 0.95 parts of additives including dibutyltindilaurate and SILWET® L7500 wetting agent, 32.46 parts of carbamylmethylaminotriazine made in accordance with Example I, and 13.36 parts of solvent to form a homogeneous mixture. The resulting coating composition is hereinafter referred to as Coating 6.

Comparative Results

Coatings 1–6 were tested for cure by measuring their respective pencil hardness. For these pencil hardness tests, the coatings were applied by spray application onto BONDERITE® 1000/P60 steel panels, commercially available cold rolled steel.

After a five minute flash period at ambient temperature, the coated panels were cured for 20 minutes at 177° C. in an industrial curing oven. Then, after 24 hours, the coated panels were tested for pencil hardness by ASTM Method D-3363-92a. For purposes of this analysis, films having a hardness ratings of at least HB or greater were considered to be cured.

The control coating composition from Example VIII was applied to BONDERITE® 1000/P60 steel panels and tested in the same manner as Coating 1. Similarly, Control Sample A was also applied to BONDERITE® 1000/P60 steel panels and tested in the same manner as Coatings 2–6.

The comparative results of these pencil hardness tests are set out in Table 1 which follows:

TABLE 1

Comparison of Acetoacetylated Polymers Crosslinked with Carbamylmethylaminotriazine to Standard Commercially Available Polymers

| Example | Coating | Pencil Hardness |
|---|---|---|
| VIII | Coating 1 (pigmented) | F |
|  | Control Coating (pigmented) | 3H |
| IX | Coating 2 (unpigmented) | H |
|  | Control Sample A (unpigmented) | 2H |
| X | Coating 3 (unpigmented) | HB |
|  | Control Sample A (unpigmented) | 2H |
| XI | Coating 4 (unpigmented) | H |
|  | Control Sample A (unpigmented) | 2H |
| XII | Coating 5 (unpigmented) | H |
|  | Control Sample A (unpigmented) | 2H |
| XIII | Coating 6 (unpigmented) | 3H |
|  | Control Sample A (unpigmented) | 2H |

Accordingly to ASTM-D3363-92a, the pencil test film hardness scale is as follows:

6B - 5B - 4B - 3B - 2B - B - HB - F - H - 2H - 3H - 4H - 5H - 6H

Softer → Harder

The data compiled in Table 1 demonstrates that acetoacetylated polymers can successfully be cured via being crosslinked with carbamylmethylaminotriazine to produce a film with a satisfactory hardness level. In addition to the above, it was noted that Coating 2 had the lowest V.O.C. level.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A curable coating composition comprising:
   (a) an acetoacetylated polymer, and
   (b) a triazine compound selected from the group consisting of:
      (i) triaminotriazine compounds of the formula $C_3N_6(CH_2OR)_{6-x}(CH_2NHCOOR')_x,$ (ii) benzoguanamine compounds of the formula $C_3N_5(C_6H_5)(CH_2OR)_{4-y}(CH_2NHCOOR')_y,$ (iii) oligomers of (i) or of (ii), and
      (iv) mixtures of at least two of any of (i), (ii) and (iii), wherein the R and R' groups are, independently, radicals derived from monoalkyl ethers of alkylene glycols having at least 4 carbon atoms and monoaryl ethers of alkylene glycols having at least 8 carbon atoms, alone or combined with alkyl groups having from 1 to 20 carbon atoms, where x is in the range of from 2 to 6, and where y is in the range of from 2 to 4.

2. A curable coating composition as in claim 1, wherein the R and R' groups are derived from monoalkyl ethers of alkylene glycols having from 4 to 12 carbon atoms alone or combined with alkyl groups having 1 to 4 carbon atoms.

3. A curable coating composition as in claim 2, wherein the R and R' groups are derived from monoalkyl ethers of propylene glycol, diethylene glycol or dipropylene glycol.

4. A curable coating composition as in claim 1, wherein x is in the range of from 3 to 6, and wherein y is in the range of from 3 to 4.

5. A curable coating composition as in claim 1 further comprising an active hydrogen containing material.

6. A curable coating composition as in claim 5, wherein the active hydrogen containing material comprises a polymeric material having at least one active hydrogen selected from the group consisting of carboxylic acid, hydroxy, amino, amido, thiol and mixtures thereof.

7. A curable coating composition as in claim 5, wherein the active hydrogen containing polymeric material comprises a compound selected from the group consisting of hydroxy functional acrylic polymers, hydroxy functional polyesters, hydroxy functional polyurethanes, hydroxy functional epoxy polymers, hydroxy functional epoxy-amine reaction product polymers and mixtures thereof.

8. A curable coating composition as in claim 5 further comprising a cure catalyst.

9. A curable coating composition as in claim 8, wherein the cure catalyst comprises a compound selected from the group consisting of a tin catalyst alone and a tin catalyst in combination with an acid catalyst.

10. A curable coating composition as in claim 1, wherein components (a) and (b) are dispersed in water or in mixtures of water and organic solvent.

11. A curable coating composition as in claim 1, wherein the triazine compound is present in an amount of at least 5 percent by weight based on total weight of the curable coating composition.

12. A curable coating composition as in claim 1, wherein the weight ratio of the triazine compound to the acetoacetylated polymer ranges from 1:20 to 1:12.

13. A curable coating composition as in claim 1, wherein the acetoacetylated polymer has the general formula:

$$\Phi\text{-O}-\overset{\text{O}}{\underset{\|}{\text{C}}}-\text{CH}_2-\overset{\text{O}}{\underset{\|}{\text{C}}}-\text{CH}_3$$

wherein Φ is a polymeric backbone.

14. A curable coating composition as in claim 13, wherein the acetoacetylated polymer is selected from the group consisting of acetoacetylated polyesters and acetoacetylated acrylics.

15. A curable coating composition comprising:
   (a) an acetoacetylated polymer, and
   (b) a triazine compound selected from the group consisting of:
      (i) triaminotriazine compounds of the formula $C_3N_6(CH_2OR)_{6-x}(CH_2NHCOOR')_x$, (ii) benzoguanamine compounds of the formula $C_3N_5(C_6H_5)(CH_2OR)_{4-y}(CH_2NHCOOR')_y$, (iii) oligomers of (i) or of (ii), and
      (iv) mixtures of at least two of any of (i), (ii) and (iii), wherein the R groups are, independently, hydrogen or alkyl groups of from 1 to 12 carbon atoms, where the R' groups are, independently, alkyl groups of from 1 to 20 carbon atoms, where x is in the range of from 2 to 6, and where y is in the range of from 2 to 4.

16. A curable coating composition as in claim 15, wherein components (a) and (b) are dispersed in water or in mixtures of water and organic solvent.

17. A curable coating composition as in claim 15, wherein the triazine compound is present in an amount of at least 5 percent by weight based on total weight of the curable coating composition.

18. A curable coating composition as in claim 15, wherein the weight ratio of the triazine compound to the acetoacetylated polymer ranges from 1:20 to 1:12.

19. A curable coating composition as in claim 15, wherein the acetoacetylated polymer has the general formula:

$$\Phi\text{-O}-\overset{\text{O}}{\underset{\|}{\text{C}}}-\text{CH}_2-\overset{\text{O}}{\underset{\|}{\text{C}}}-\text{CH}_3$$

wherein Φ is a polymeric backbone.

20. A curable coating composition as in claim 19, wherein the acetoacetylated polymer is selected from the group consisting of acetoacetylated polyesters and acetoacetylated acrylics.

21. A curable coating composition comprising:
   (a) an acetoacetylated polymer, and
   (b) a triazine compound selected from the group consisting of:
      (i) triaminotriazine compounds of the formula $C_3N_6(CH_2OR)_{6-x}(CH_2NHCOOR')_x$, (ii) benzoguanamine compounds of the formula $C_3N_5(C_6H_5)(CH_2OR)_{4-y}(CH_2NHCOOR')_y$, (iii) oligomers of (i) or of (ii), and
      (iv) mixtures of at least two of any of (i), (ii) and (iii), wherein the R groups are, independently, hydrogen or alkyl groups of from 1 to 12 carbon atoms, where the R' groups are, independently, beta-hydroxyalkyl groups of from 2 to 18 carbon atoms, alone, or combined with alkyl groups of from 1 to 18 carbon atoms, where x is in the range of from 3 to 6, and where y is in the range of from 2 to 4.

22. A curable coating composition as in claim 21, wherein components (a) and (b) are dispersed in water or in mixtures of water and organic solvent.

23. A curable coating composition as in claim 21, wherein the triazine compound is present in an amount of at least 5 percent by weight based on total weight of the curable coating composition.

24. A curable coating composition as in claim 21, wherein the weight ratio of the triazine compound to the acetoacetylated polymer ranges from 1:20 to 1:12

25. A curable coating composition as in claim 21, wherein the acetoacetylated polymer has the general formula:

$$\Phi\text{-O}-\overset{\text{O}}{\underset{\|}{\text{C}}}-\text{CH}_2-\overset{\text{O}}{\underset{\|}{\text{C}}}-\text{CH}_3$$

wherein Φ is a polymeric backbone.

26. A curable coating composition as in claim 25, wherein the acetoacetylated polymer is selected from the group consisting of acetoacetylated polyesters and acetoacetylated acrylics.

27. An article of manufacture comprising at least one surface coated with a curable coating composition, wherein said composition comprises:
   (a) an acetoacetylated polymer, and
   (b) a triazine compound selected from the group consisting of:
      (i) triaminotriazine compounds of the formula $C_3N_6(CH_2OR)_{6-x}(CH_2NHCOOR')_x$, (ii) benzoguanamine compounds of the formula $C_3N_5(C_6H_5)(CH_2OR)_{4-y}(CH_2NHCOOR')_y$, (iii) oligomers of (i) or of (ii), and
      (iv) mixtures of at least two of any of (i), (ii) and (iii),
      wherein the R and R' groups are, independently, radicals derived from monoalkyl ethers of alkylene glycols having at least 4 carbon atoms and monoaryl ethers of alkylene glycols having at least 8 carbon atoms, alone or combined with alkyl groups having from 1 to 20 carbon atoms, where x is in the range of from 2 to 6, and where y is in the range of from 2 to 4, or
      wherein the R groups are, independently, hydrogen or alkyl groups of from 1 to 12 carbon atoms, where the R' groups are; independently, alkyl groups of from 1 to 20 carbon atoms, where x is in the range of from 2 to 6, and where y is in the range of from 2 to 4, or wherein the R groups are, independently, hydrogen or alkyl groups of from 1 to 12 carbon atoms, where the R' groups are, independently, beta-hydroxyalkyl groups of from 2 to 18 carbon atoms, alone, or combined with alkyl groups of from 1 to 18 carbon atoms, where x is in the range of from 3 to 6, and where y is in the range of from 2 to 4.

* * * * *